US008956985B2

(12) United States Patent
Lampo et al.

(10) Patent No.: US 8,956,985 B2
(45) Date of Patent: Feb. 17, 2015

(54) BALLISTIC PANELS AND METHOD OF MAKING THE SAME

(75) Inventors: Steven Michael Lampo, Lincoln University, PA (US); Andrea Biro, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 1008 days.

(21) Appl. No.: 12/719,387

(22) Filed: Mar. 8, 2010

(65) Prior Publication Data

US 2011/0214559 A1    Sep. 8, 2011

(51) Int. Cl.
*F41H 5/04* (2006.01)
*B32B 37/00* (2006.01)
*B32B 37/06* (2006.01)

(52) U.S. Cl.
CPC ............. *F41H 5/0478* (2013.01); *B32B 37/00* (2013.01); *B32B 37/06* (2013.01); *F41H 5/04* (2013.01)
USPC .......................................... 442/134; 442/135

(58) Field of Classification Search
CPC ............ B32B 37/00; B32B 37/06; F41H 5/04
USPC .......... 428/911, 53.55, 57, 58, 59, 60, 61, 68, 428/74, 76; 442/1, 134, 135; 2/2.5; 89/36.02, 904, 915
See application file for complete search history.

(56) References Cited

U.S. PATENT DOCUMENTS

| 3,953,566 | A |   | 4/1976  | Gore |
| 4,194,041 | A |   | 3/1980  | Gore et al. |
| 4,413,357 | A |   | 11/1983 | Sacks |
| 4,532,316 | A |   | 7/1985  | Henn |
| 4,656,080 | A | * | 4/1987  | Takahashi et al. ............ 428/215 |
| 4,862,730 | A |   | 9/1989  | Crosby |
| 5,471,906 | A | * | 12/1995 | Bachner et al. ..................... 2/2.5 |
| 5,733,966 | A | * | 3/1998  | Cline et al. ..................... 524/590 |
| 5,824,940 | A |   | 10/1998 | Chediak et al. |
| 5,880,042 | A |   | 3/1999  | Schuster et al. |
| 6,363,527 | B1 |  | 4/2002  | Biermann et al. |
| 6,704,934 | B2 | * | 3/2004 | Graham et al. ..................... 2/2.5 |
| 2005/0197020 | A1 |  | 9/2005 | Park et al. |
| 2007/0272606 | A1 |  | 11/2007 | Freese |

FOREIGN PATENT DOCUMENTS

| GB | 208094       | 12/1923 |
| GB | 2315984      | 2/1998  |
| JP | 6164447      | 4/1986  |
| JP | 9503852      | 4/1997  |
| JP | 10-503007    | 3/1998  |
| JP | 2003-130591  | 5/2003  |

(Continued)

OTHER PUBLICATIONS

International Search Report, PCT/US2011/027561, Nov. 24, 2011, 3 pages.

*Primary Examiner* — Arti Singh-Pandey
(74) *Attorney, Agent, or Firm* — Amy L. Miller

(57) ABSTRACT

A ballistic panel is described that comprises a ballistic-resistant component and a cover that comprises a laminate comprising (i) a substrate layer and (ii) an inner bonding layer. The cover is bonded to at least one surface of the ballistic-resistant component by the inner bonding layer of the laminate, and is bonded around the perimeter of the ballistic resistant component to form a perimeter seal. A method for making the ballistic panel is also described.

54 Claims, 11 Drawing Sheets

(56) References Cited

FOREIGN PATENT DOCUMENTS

| | | |
|---|---|---|
| JP | 2008-505302 | 2/2008 |
| JP | 2009-505865 | 2/2009 |
| NO | 20015507 | 12/2003 |
| WO | WO2006002977 | 1/2005 |
| WO | WO 2006002977 A1 * | 1/2006 ................ F41H 5/04 |
| WO | 2006-136323 | 12/2006 |
| WO | WO2007097780 | 8/2007 |
| WO | WO 2007097780 A2 * | 8/2007 ................ B32B 5/28 |
| WO | 2008-004993 | 1/2008 |

* cited by examiner

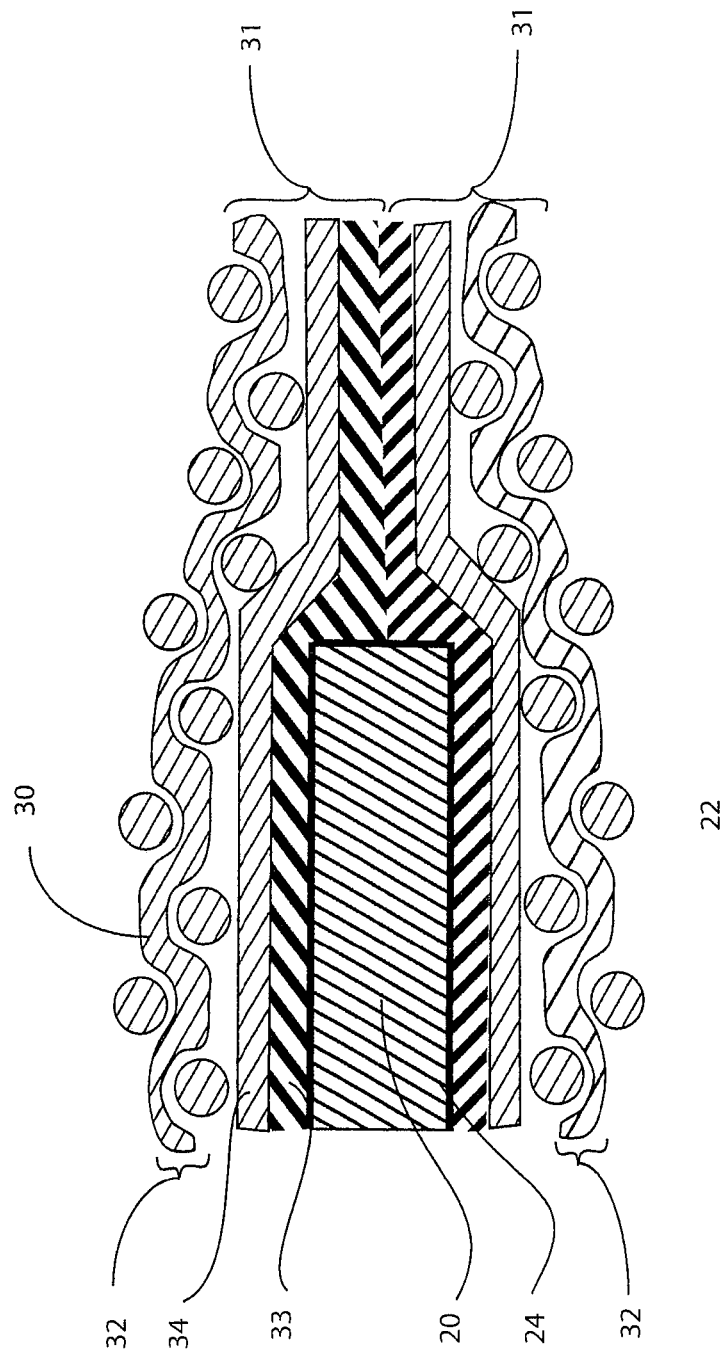

BALLISTIC PANELS AND METHOD OF MAKING THE SAME

BACKGROUND

1. Field of the Invention

A cover for a flexible ballistic resistant component is described. Ballistic panels comprising a cover and a flexible ballistic-resistant component are also described. The cover comprises a laminate that is sealed around the perimeter and to the surface of the ballistic-resistant component that secures the cover to the ballistic-resistant component.

2. Description of Related Art

Ballistic materials saturated with a significant amount of water or other liquids may lose a significant portion of the ability to stop bullets. One approach to protecting against water saturation is to treat each layer of the ballistic material with a waterproofing agent. While somewhat effective at reducing water saturation, this approach results in stiffening of the resulting ballistic material, reducing comfort and flexibility. Another approach is to cover the ballistic material with a waterproof component; however, non-breathable waterproof materials increase the thermal burden to the wearer, decreasing wearer comfort. In addition, any significant moisture from the manufacturing environment, or significant water ingress resulting from unknown pinholes or cracks developed through normal wear, may get trapped within the non-breathable cover and potentially degrade ballistic performance.

Enclosing ballistic material within a cover made from materials such as nylon is known. Covers made from other materials such as nylon in combination with polytetrafluoroethylene have been used to improve breathability while reducing the exposure of the ballistic material from perspiration or other liquids that can compromise the penetration resistance of the ballistic material. Covers are made that have seams to hold the multiple sheets of material together. The ballistic material is enclosed inside the cover, providing a gap between the cover and the ballistic material.

Ballistic materials are often placed in a cloth carrier, having multiple straps for attachment around the shoulders and torso of a wearer.

SUMMARY

A ballistic panel is described that comprises a ballistic-resistant component and a cover that comprises a laminate comprising (i) a substrate layer, and (ii) an inner bonding layer, wherein the cover is bonded to at least one surface of the ballistic-resistant component by the inner bonding layer of the laminate. The cover further comprises a second material layer adjacent the opposite surface of the ballistic-resistant component to which the laminate is bonded. The second material is bonded to the laminate around the perimeter of the ballistic resistant component forming a perimeter seal beyond the edge of the ballistic-resistant component. A method for making the ballistic panel is also described. Ballistic panels are described, for example, that report durable waterproofness and improved ballistic performance.

DESCRIPTION OF THE DRAWINGS

The operation of the present invention should become apparent from the following description when considered in conjunction with the accompanying drawings, in which:

FIG. 2b is a partial cross-sectional view of one embodiment of a ballistic panel described herein.

DETAILED DESCRIPTION OF THE INVENTION

Figure 1:
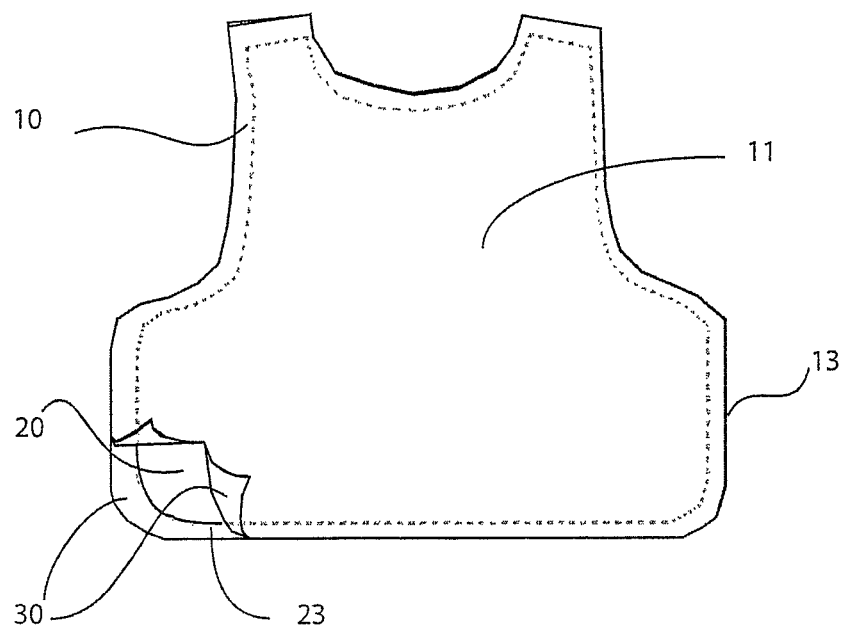
FIG. 1 is an elevational view of the outer surface of one embodiment of a ballistic panel described herein.
Figure 2A:
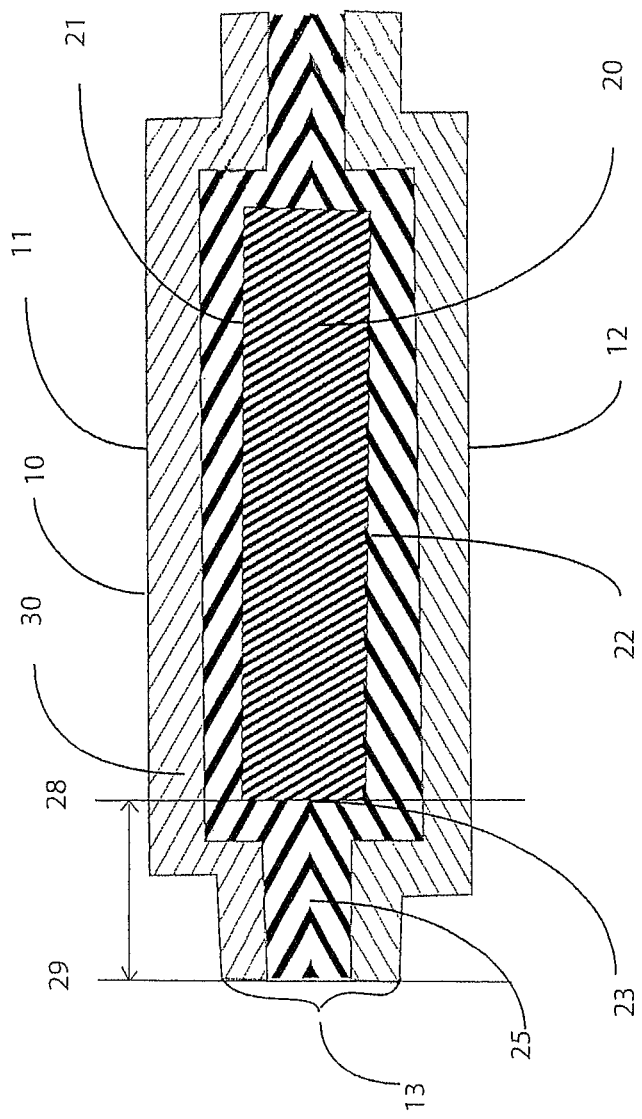
FIG. 2a is a cross-sectional view of one embodiment of a ballistic panel described herein.

FIG. 1 is an elevational view, and FIG. 2a is a cross-sectional view, of an example of one embodiment of a ballistic panel (10) that comprises an outer surface (11) that faces away from a body of a wearer in use, an inner surface (12) that faces towards the body of a wearer in use, and a ballistic panel edge (13) surrounding the perimeter of the ballistic panel (10). The ballistic panel (10) comprises a ballistic-resistant component (20) and a cover (30).

Figure 3:
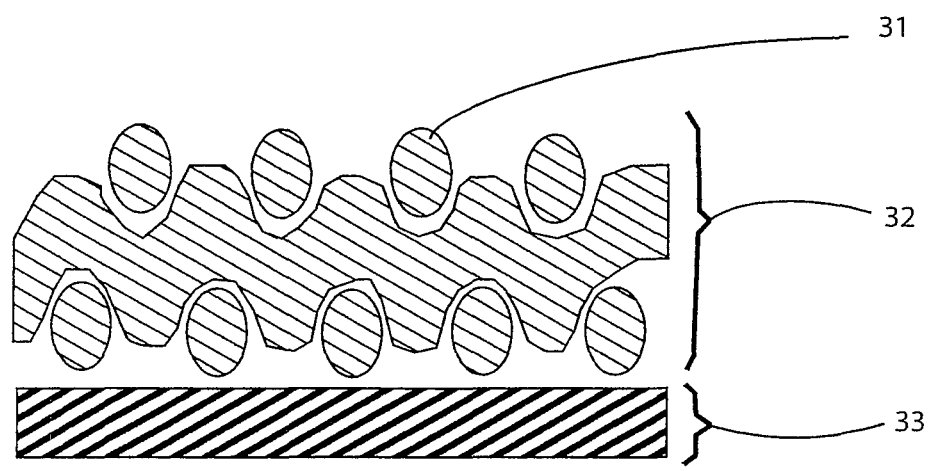
FIG. 3 is a cross-sectional view of one embodiment of a laminate used in a ballistic panel described herein.

The ballistic-resistant component (20) comprises a first surface (21), a second surface (22), and a ballistic-resistant component edge (23) surrounding the perimeter of the ballistic resistant component (20). The cover (30) comprises a laminate (31) as exemplified in FIG. 3. As illustrated in FIGS. 2a and 2b (FIG. 2b is a partial cross-sectional view), the cover (30) is attached to at least one of the first and second surfaces (21, 22) of the ballistic-resistant component (20) by one or more bonds (24), bonding at least one of the first and second surfaces of the ballistic-resistant component (20) and the cover (30) together. By bonding the ballistic-resistant component and the cover together, movement of the ballistic-resistant component within the cover during use or maintenance is greatly reduced or eliminated. This prevents the ballistic-resistant component from sagging, bunching, or folding within the cover, which could potentially decrease areal protection or form creases which may result in areas of reduced protection.

The laminate (31) of one embodiment comprises a substrate layer, such as an outer fabric textile layer (32) and an inner bonding layer (33) for bonding the laminate to the ballistic-resistant component (20). The laminate (31) may further comprise additional layers as described herein. The laminate is positioned on a ballistic-resistant component (20) so that the outer fabric layer (32) is oriented away from the ballistic-resistant component (20), and the inner bonding layer (33) is positioned so that it faces the ballistic-resistant component (20).

The outer fabric layer (32) may be a knit, nonwoven or woven textile, and may comprise fibers comprising polyester, nylon, aramid such as those sold under the trade name Nomex®, cotton, or blends comprising at least one of these fibers. Textile weights ranging from about 1.0 oz/yd$^2$ to about 6.0 oz/yd$^2$ are useful for forming laminates having a total laminate weight of between about 3 oz/yd$^2$ to about 80 oz/yd$^2$. However, in other embodiments, laminate weights of between about 2 oz/yd$^2$ and 10 oz/yd$^2$ may be suitable for forming the ballistic panels described herein.

The inner bonding layer (33) is comprised of bonding material for affixing the laminate (31) to the ballistic-resistant component, and may be in the form of a monolithic or microporous film, provided with or without a release liner. A film may comprise blown thermoplastic polyurethanes (TPU) films such as those provided by Bayer MaterialScience, LLC (Whately, Mass.). A bonding film comprising a release liner includes cast polyurethane, such as those available from Omniflex, Inc. (Greenfield, Mass.).

In some embodiments, the inner bonding layer (33) has a bonding film thickness that is adequate to affix the cover (30) to the ballistic-resistant component (20) to reduce movement, such as shifting or sagging of the ballistic-resistant component (20) within the cover (30) during use or maintenance of the ballistic panel (10). An inner bonding layer (33) having a thickness of greater than about 25 μm may be suitable for use in the ballistic panels (10) described. In other embodiments inner bonding layers (33) may have a thickness of greater than or equal to 35 μm or greater than or equal to 50 μm, or greater than or equal to 60 μm, or greater than or equal to 75 μm. Films having a mass greater than about 30 gsm (grams per square meter), or greater than about 40 gsm, or greater than about 50 gsm, or greater than about 60 gsm, may be suitable for use in the inner bonding layers of the laminate. In one embodiment the inner bonding layer is a polyurethane film having a mass greater than about 50 gsm. The thickness and mass of the inner bonding layer may depend on several factors, for example on the surface roughness or porosity of the ballistic-resistant component to which the laminate is bonded, or the ability of the inner bonding layer to bond to the ballistic material.

In some embodiments, the laminate (31) and the ballistic-resistant component (20) are affixed across a significant portion of the surface of the ballistic-resistant component (20) by a continuous bond between the inner bonding layer (33) and the ballistic-resistant component. In some embodiments, a ballistic panel (10) is formed where the inner bonding layer (33) is bonded to the ballistic-resistant component (20) for greater than about 15% of the surface area of the ballistic-resistant component (20). For purposes herein, the cover and the ballistic-resistant component are considered to be integrated where the inner bonding layer of the laminate is bonded to the ballistic-resistant component for greater than 15% of the surface area of the ballistic-resistant component. The ballistic panel having an integrated cover and ballistic-resistant component has reduced movement, such as shifting or sagging, of the ballistic-resistant component within the cover during use or maintenance.

In other embodiments, a bond between the laminate (31) and the ballistic-resistant component (20) comprises greater than about 20%, or greater than about 40%, or greater than about 60%, or greater than about 80% or greater than about 90%, of the surface area of the ballistic-resistant component. In one embodiment, the inner bonding layer (33) comprises a thermally processable film that has sufficient thickness so that upon melting, the entire surface area, about 100% of the first (21) and second (22) surfaces ballistic-resistant component (20), is bonded with the inner bonding layer (33).

In some embodiments, the level of flexibility may decrease with as a greater percentage of the surface of the ballistic-resistant component is bonded to the laminate by the inner bonding layer. Alternatively, where flexibility is important it may be desirable to use an inner bonding layer (33) having a thickness of less than or equal 125 μm, or less than or equal to about 100 μm, or less than or equal to about 90 μm.

Further with regard to the laminate, the inner bonding layer (33) is attached directly to the outer fabric layer (32) by any suitable known lamination technique. Alternatively, in one embodiment as exemplified in FIG. 4, the laminate (31) comprises a middle thermally stable polymer layer (34) between the inner bonding layer (33) and the outer fabric layer (32). The thermally stable polymer layer (34) is useful for applications where the inner bonding layer (33) is attached to the ballistic-resistant component by thermal bonding. Thus, a suitable thermally stable polymer layer (34) has a melt temperature above the melt temperature of the inner bonding layer (33) that melts to affix the laminate (31) to the ballistic-resistant component (20). The thermally stable polymer layer (34) may also be useful for preventing melt flowing of the inner bonding layer (33) into the outer fabric layer (32) upon the application of heat for bonding.

Figure 4:
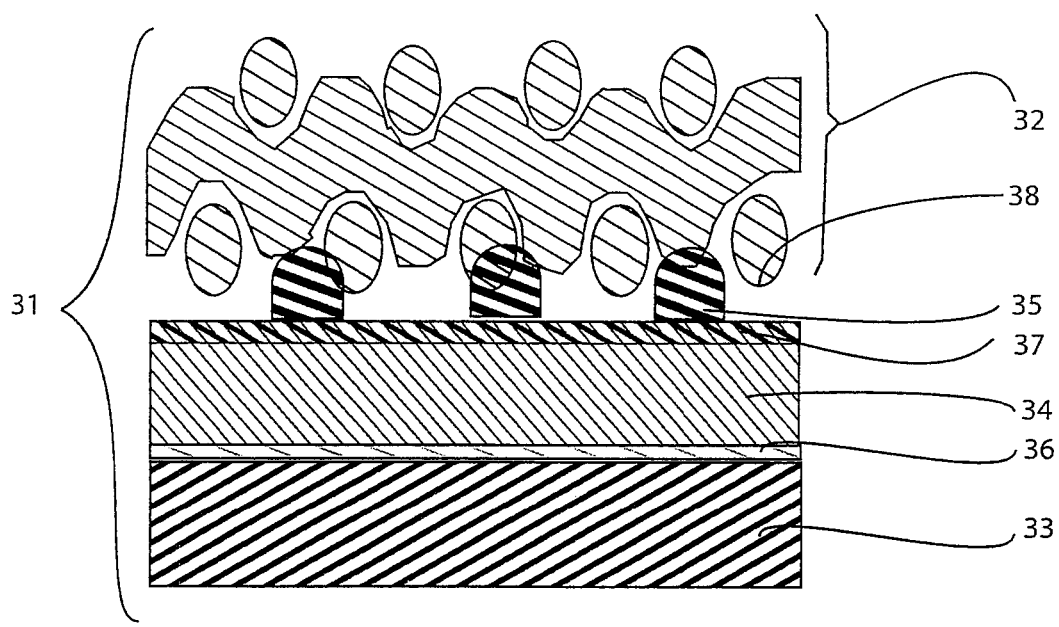
FIG. 4 is a cross-sectional view of one embodiment of a laminate used in a ballistic panel described herein.

The outer fabric layer (32), inner bonding layer (33) and optional thermally stable polymer layer (34) may be joined by a continuous layer (36) or discontinuous adhesive attachments, such as dots (35), or a combination of attachment bonds, as exemplified in FIG. 4. Any suitable process for joining the outer fabric, inner bonding, and optional thermally stable polymer layers of a laminate together may be used, such as gravure lamination, fusion bonding, spray adhesive bonding, and the like. Where gravure lamination is used to laminate layers together, the adhesive may be applied discontinuously as discrete dots (35) in order adhere two layers together while optimally maintaining breathability through the laminate layers. If a breathable adhesive is used, then adhesive surface coverage from about 5% up to about 60% may be acceptable. In some instance, adhesive surface coverage as high as about 80% or about 90% or about 100% may be acceptable.

When contamination resistance is desired, oleophobic and/or chemically resistant materials can be used. For example, the optional middle thermally stable polymer layer (34) may be a chemically resistant sheet of barrier film that provides protection to the underlying ballistic-resistant component (20). A laminate (31) comprising the barrier film may resist the passage of liquid through the cover (10), providing waterproofness and/or resistance against the penetration of toxic chemicals. A laminate is considered 'waterproof' if it passes the test described herein for waterproofness (Suter). Laminates described herein may also be resistant to penetration by chemicals, such as sulfuric acid and/or hydraulic fluid, where 'chemical penetration resistance' is defined by the test methods described herein. Laminates described herein may also be waterproof after contamination by chemicals such as DEET (N,N-diethyl-meta-toluamide) and Hoppe's® fluid, where 'waterproof after contamination' is defined by the test methods described herein.

In one embodiment, a sheet of a porous fluorocarbon, such as a film comprising polytetrafluoroethylene (PTFE), is a particularly useful barrier film suitable for use as the middle thermally stable polymer layer (34) where waterproofness and chemical resistance are desired while maintaining breathability. Expanded PTFE (ePTFE) membranes which have been expanded to create a network of fibrils interconnecting polymeric nodes to form a porous microstructure are useful as a middle thermally stable polymer layer (34), for example, due to the flexibility, light weight, strength, water penetration resistance, and breathability of these materials. Expanded PTFE membranes can be produced in a known manner such as in accordance with the teachings of U.S. Pat. No. 3,953,566 (to Gore).

In situations where the laminate (31) may be contaminated by substances that reduce waterproofness, or reduce ability of the laminate to resist the passage of toxic chemicals, a low surface energy polymeric coating may be applied to a barrier film. Suitable low surface energy coatings include those taught in U.S. Pat. Pub. No. 2007/0272606. In another embodiment, the thermally stable polymer layer (34) may also serve as a barrier film. Further, the thermally stable polymer layer (34) comprising an ePTFE membrane layer may be coated with a monolithic, breathable, polymer coating on at least one surface of the ePTFE membrane layer to provide resistance to oil, sebum, or chemical penetration resistance.

In one embodiment, with reference to FIG. 4, a thermally stable polymer layer (34) in the form of a porous ePTFE barrier film having a monolithic polymer coating (37) is laminated to the outer fabric layer (32) by dot adhesive (35), attaching the side of the barrier film comprising the monolithic coating (37) directly to the inner surface (38) of the outer fabric layer (32). One example of a suitable coating comprises a continuous, non-porous coating of polyurethane applied to a microporous ePTFE in accordance with U.S. Pat. No. 4,194,041 in a layer comprising approximately 12 g/m². Another example of a monolithic polymer coating material for use on a barrier film comprises a polyurethane comprising type GA-1 hydrophilic prepolymer (DOW Chemical, Midland, Mich.) cured with an amine curing agent. In one embodiment, the thermally stable polymer layer comprises an ePTFE layer with a continuous, non-porous coating having a weight of about 0.85 oz/yd² (29 g/m²).

In a further embodiment, a thermally stable polymer layer (34) is a barrier film in the form of a composite comprising a first ePTFE membrane layer and a second ePTFE membrane layer. In one embodiment, the first ePTFE membrane layer comprises a monolithic polymer coating, and the second ePTFE membrane layer may be adjacent to either the monolithically coated side of the first ePTFE membrane layer, or on a side of the first ePTFE membrane layer that is opposite the monolithic coating. Breathable porous ePTFE membranes and ePTFE composite films having a minimum MVTR of about 13,000 g/m²/24 hours are useful where high breathability through the laminate is desired.

Other materials suitable for use as the thermally stable polymer layer (34) include other films, such as a plastic film. Suitable plastic films include those comprising polyurethane, silicone, or polyester. Where the laminate (31) is to be affixed to the ballistic-resistant component (20) by thermal bonding, the plastic film should have a melt temperature that is higher than the melt temperature of the bonding film used for the inner bonding layer (33).

Laminates (31) described herein may be breathable having an MVTR of greater than 1000, or greater than 2000, or greater than 3000, or greater than 4000, or greater 5000, when tested according to the method described herein.

In other embodiments, laminates are formed that are impermeable to moisture vapor. A material is considered moisture vapor impermeable if it has a moisture vapor transmission rate less than 1,000 g/m²/24 hr. An impermeable laminate (31) can be constructed having either a moisture vapor impermeable outer layer or a moisture vapor impermeable inner bonding layer, or both inner and outer layers can be impermeable to moisture. Suitable materials for forming a moisture vapor impermeable layer may include polyethylene or polyvinyl chloride, in the form of a moisture vapor impermeable film. A laminate comprising a moisture vapor impermeable outer layer may have a moisture vapor permeable inner bonding layer in the form of a thermoplastic polyurethane (TPU) film. In an alternate embodiment, an impermeable laminate may comprise a moisture vapor permeable outer layer, such as a woven nylon, and a moisture vapor impermeable inner layer. In yet another embodiment, an impermeable laminate comprises a moisture vapor impermeable outer layer and an inner bonding layer in the form of a contact adhesive, such as an adhesive sold under the trade name, Scotch-Grip™ (3 M™.)

Figure 5A:
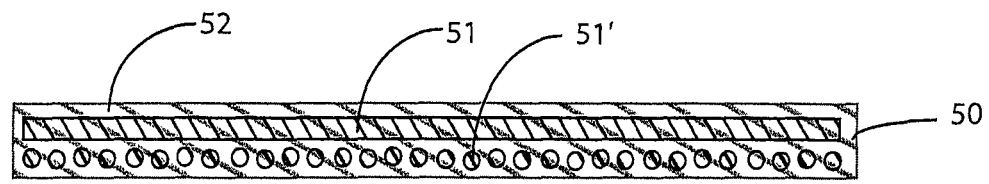
FIGS. 5a-5d are cross-sectional views of embodiments of materials used in forming ballistic-resistant components used in ballistic resistant panels described herein.
Figure 5B:
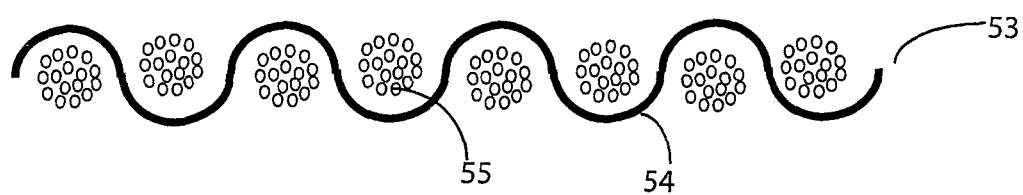

With reference to FIG. 2a, the ballistic panel (10) comprises the cover (30) comprising the laminate described herein and a flexible ballistic-resistant component (20) that is available from a variety of sources. Suitable ballistic-resistant components comprise multiple layers of ballistic penetration-resistant materials. The ballistic materials may comprise non-woven unidirectional fibers, and woven yarns comprising for example, aramid fibers, such as p-aramid, ultra high molecular weight polyethylene, polyamide, and combinations thereof. One example of a sheet of non-woven ballistic material is illustrated in FIG. 5a, which depicts a cross-sectional view of two layers of non-woven (50) unidirectional fibers (51 and 51') and a resin (52) surrounding the fibers. FIG. 5b illustrates a cross-sectional view of an example of a layer woven ballistic material (53) comprising woven fiber bundles (54, 55) which, in one embodiment, may optionally have resin surrounding the fibers.

Figure 5C:
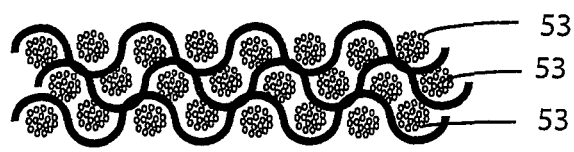
Figure 5D:
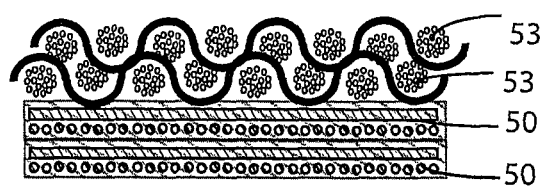

The ballistic-resistant component (20) is comprised of multiple layers of non-woven, unidirectional ballistic materials (FIG. 5a), layers of woven ballistic resistant materials (FIG. 5c), or a combination of layers of both woven and non-woven ballistic resistant materials (5d). In one embodiment, a ballistic-resistant component (20) comprises about twenty two layers of a woven ballistic material (53). In another embodiment, a ballistic resistant component (20) comprises four layers of woven ballistic material (50) and 24 sheets of a non-woven unidirectional material (50). In addition to the non-woven and/or woven fiber layers, the multilayer ballistic-resistant component may further comprise layers of other materials including polymers such as polycarbonate, polyethylene and the like. Flexible ballistic-resistant materials also include materials sold under the trade name "Kevlar®", "Twaron®", "GoldShield®", "Dyneema®", and "Spectra®" which are suitable for use as the ballistic-resistant component for the ballistic panels described herein.

With reference to FIG. 6, to form a ballistic panel (10), a first laminate portion (31) and second laminate portion (31') described above are oriented to cover both the first and second surfaces (21, 22) of a ballistic-resistant component (20). The laminate portions (31, 31') are of a size sufficiently large to extend beyond the edge (23) surrounding the perimeter of the ballistic resistant component (20). The inner bonding layer (33) of each of the first and second portions of laminate is positioned adjacent the first (21) and second (23) surfaces of the ballistic-resistant component (20), and the outer fabric layer (32) is positioned outwardly. The laminate (21) is bonded to the ballistic-resistant component by affixing the inner bonding layer (33) to bond to the first or second surfaces, or both first and second surfaces (21, 22).

Additionally, the areas of each portion of laminate (31) that extends beyond the edge (23) of ballistic-resistant component (20) are affixed together by contacting and bonding the inner bonding layer (33) of each portion of laminate directly together just beyond the edge (23) of the ballistic-resistant component to form a perimeter seal (25). The laminate portions are bonded together continuously, around the entire perimeter of the ballistic-resistant component. By bonding the inner bonding layers of the first (31) and second (31') laminate portions together around the entire perimeter, a cover is formed comprising a continuous, perimeter seal (25). With reference to FIG. 2a, the width of the perimeter seal (25) is measured as the distance between the end (28) of the perimeter seal (25) nearest the edge (23) of the ballistic-resistant component and the end (29) of the perimeter seal (25) nearest the edge the perimeter of the cover. In one embodiment, the width of the perimeter seal is about 10 mm or greater; in another embodiment the width of the perimeter seal is about 15 mm or greater. In other embodiments, the perimeter seal is greater than about 20 mm, or greater than about 25 mm.

Figure 6A:
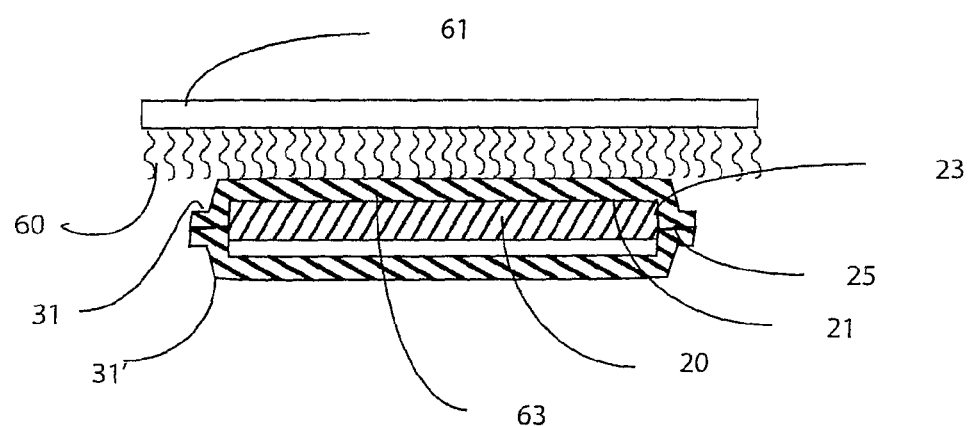
FIG. 6a is a cross-sectional view of a schematic representation of a process step for making an exemplary embodiment of a ballistic panel described herein.
Figure 6B:
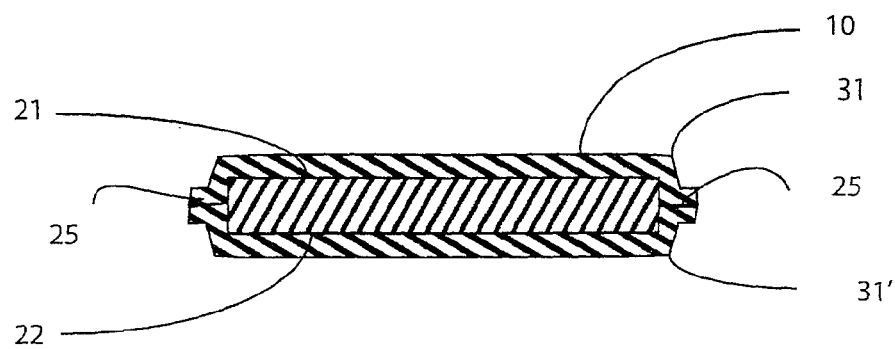
FIG. 6b is a cross-sectional view of a schematic representation of a ballistic panel described herein.
Figure 10:
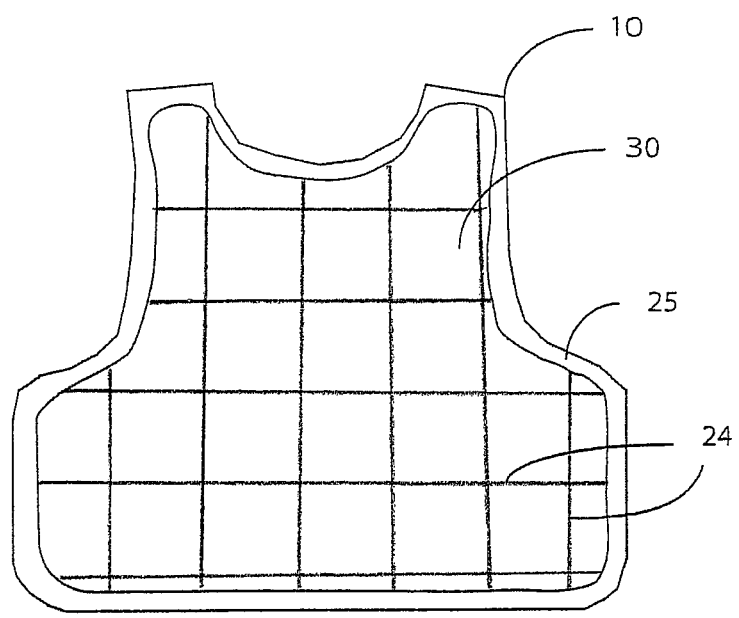
FIG. 10 is an elevational view of the outer surface of one embodiment of a ballistic panel described herein.

Heat processing may be used to melt bond the first and second laminate portions (31, 31') to the ballistic-resistant component (20) and, to form a perimeter seal (25), where the inner bonding layer (33) is meltable. Thus, a method for making a ballistic panel is described wherein the laminate and the ballistic-resistant component are bonded to form a ballistic panel by heat processing techniques. Heat processes include the application of heat and pressure, radio frequency or ultrasonic welding, and the like. In one embodiment as exemplified in FIG. 6a, the laminate (31) and ballistic resistant component (20) are stacked so that the laminate completely covers the ballistic-resistant component and the laminate (31) extends beyond the ballistic-resistant component edge (23). In FIGS. 6a and 6b, the process includes the steps whereby the laminate (31) and ballistic-resistant component (20) are bonded together by the application of heat and pressure (60) applied by a heated press (61). The laminate (31) is bonded for the entire surface area of at least one of the first and second surfaces (21, 22) of the ballistic-resistant component. Heat and pressure are also applied to first and second laminate portions (31, 31') beyond the ballistic-resistant component edge (23), heat pressing laminate portions directly together to form a continuous perimeter seal. Heat and pressure may also be applied to the stack to form a discontinuous bond (24) by a heat press that applies localized heating to less than the entire surface (21, 22) of the ballistic-resistant component. For example, a heating element or platen may be used that applies heat in the pattern of a grid as illustrated in FIG. 10, to form a bond (24) in a grid pattern or patterns of other geometries, where less than 100% of the inner bonding layer is bonded to the surface (21, 22) of the ballistic-resistant component. Heat is applied at a temperature at or above the melt temperature of the meltable inner bonding layers. In one process, the heat applied to the stack is at a temperature greater than about 150° C., though in other methods, temperatures between about 120° C. and 180° C. may be suitable. In a further process, a pressure of at least 1 psi is applied to the stack; however, in other methods pressures between about 1.0 and 40 psig may be suitable.

Figure 7A:
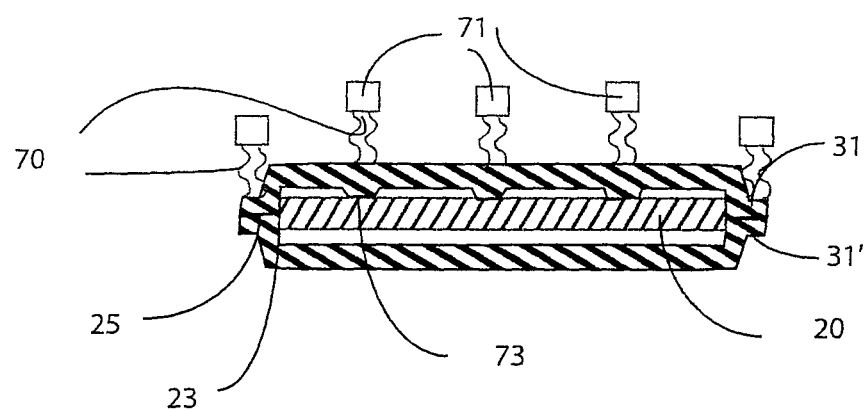
FIG. 7a is a cross-sectional view of a schematic representation of a process step for making an exemplary embodiment of a ballistic panel described herein.
Figure 7B:
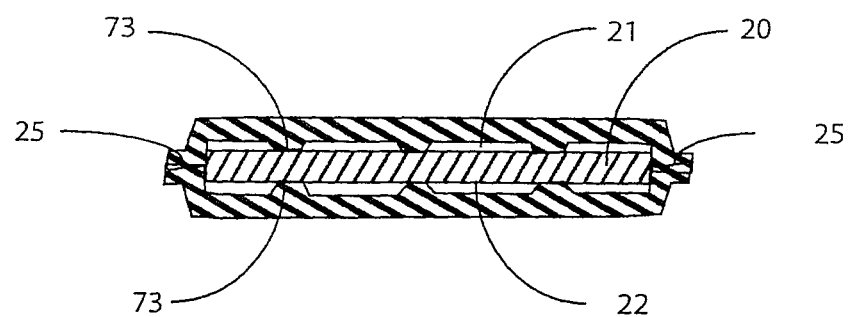
FIG. 7b is a cross-sectional view of a schematic representation of a ballistic panel described herein.

FIGS. 7a and 7b illustrate another process whereby the laminate (31, 31') and ballistic-resistant component (20) are bonded together by discontinuous bonds (73) formed by the application of heat (70) applied by a heat source (71) with or without pressure, such as a soldering iron, to multiple locations. The laminate (31, 31') is bonded to portions of at least one of the first and second surfaces (21, 22) of the ballistic-resistant component. Heat is also applied to first and second laminate portions (31, 31') beyond the ballistic-resistant component edge (23), heating laminate portions to bond directly together to form a continuous perimeter seal (25).

In a further embodiment, layers of the multilayer ballistic-resistant component (20) become fused or melted together during heat processing. For example, where a ballistic-resistant component comprises a multilayer structure of woven and/or non-woven fiber layers, and also comprises thermoplastic materials, the layers of the ballistic-resistant component (20) may become partially melted and fused together by melting the thermoplastic materials by heat processing steps, further integrating the components of the ballistic panel together. Thus, in one embodiment a ballistic panel is formed that comprises a cover bonded to the surface of a ballistic-resistant component, wherein the ballistic-resistant component (20) is a multilayered structure that comprises thermoplastic materials, and the layers of the ballistic-resistant component are joined or fused together by the thermoplastic.

In one embodiment a waterproof ballistic panel is formed comprising a waterproof laminate with that is sealed around the perimeter of the ballistic-resistant component with a perimeter seal, and bonded to at least one surface of the ballistic-resistant component. The ballistic panel is considered waterproof if it gains less than about 10% of its original dry weight when submerged in water according to the test described herein for water pick-up. In another embodiment, a durably waterproof ballistic panel is formed. The ballistic panel is considered durably waterproof if it gains less than about 10% of its original dry weight when submerged in water according to the water pick-up test, after conditioning according to the method described herein conditioning test panels. In some embodiment, ballistic panels have a water pick-up of less than about 5% of the original dry weight.

Ballistic panels described herein may be suitable for use in standard carriers for ballistic panels for forming ballistic vests, garments and the like. Alternately, in other embodiments, ballistic panels described herein can be incorporated with straps for strapping the ballistic panels directly to the body of a wearer.

The particular embodiments illustrated and described herein should not be considered limiting. It should be apparent that changes and modifications may be incorporated and embodied within the scope of the following claims.

Test Methods

Moisture Vapor Transmission Rate (MVTR)

Moisture vapor transmission rate (MVTR) was measured on laminate samples using a technique based on ISO 15496 (2004). In the procedure, approximately 70 ml of a saturated salt solution consisting of 35 parts by weight of potassium acetate and 15 parts by weight of distilled water was placed into a 133 ml polypropylene cup, having an inside diameter of 6.5 cm at its mouth. An expanded polytetrafluoroethylene (PTFE) membrane having a minimum MVTR of approximately 85,000 g/m$^2$/24 hrs. as tested by the method described in U.S. Pat. No. 4,862,730 (to Crosby), was heat sealed to the lip of the cup to create a taut, leakproof, microporous barrier containing the solution. A similar expanded PTFE membrane was mounted to the surface of a water bath. The water bath assembly was controlled at 23° C.±0.2° C., using a temperature controlled room and a water circulating bath. The sample to be tested was allowed to condition at a temperature of 23° C. and a relative humidity of 50% prior to performing the test procedure. Laminate samples were placed so the outer layer of the laminate sample (e.g. textile) was oriented away from the water bath, and the inner bonding layer of the laminate sample (e.g. thermoplastic polyurethane) was in contact with the expanded polytetrafluoroethylene membrane mounted to the surface of the water bath and allowed to equilibrate for at least 15 minutes prior to the introduction of the cup assembly. The cup assembly was weighed to the nearest $1/1000$ g and was placed in an inverted manner onto the center of the test sample. Water transport was provided by the driving force between the water in the water bath and the saturated salt solution providing water flux by diffusion in that direction. The sample was tested for 15 minutes and the cup assembly was then removed, weighed again within $1/1000$ g.

The MVTR of the laminate sample was calculated from the weight gain of the cup assembly and was expressed in grams of water per square meter of sample surface area per 24 hours.

Laminate Weight

The areal weight of the laminate was determined by cutting a 3.5 inch diameter circle out of a larger laminate sample and weighing it using a balance accurate to 0.01 grams. This weight was then converted to $oz/yd^2$ based on the area of the circle relative to the area of one square yard and converting grams to ounces. The areal weight conversion factor for this case is about 4.75. This test method is in accordance with ASTM D3776 Option C.

Suter Waterproofness Test

The Suter test procedure was a method used to determine waterproofness of a laminate; and is based on FED STD 191A, Method 5516. This procedure provided a low pressure challenge to the sample being tested by forcing water against the inner bonding layer side of the test sample and observing the outer layer side for indication of water penetration through the sample.

Laminate samples were tested for waterproofness by using a modified Suter test apparatus. Water was forced against a sample area of about 4¼-inch diameter sealed by two rubber gaskets in a clamped arrangement. The sample was open to atmospheric conditions and accessible to the testing operator. The water pressure on the sample was increased to 1.1 psig (pounds per square inch on the gauge) and held for 3 minutes, by a pump connected to a water reservoir, as indicated by an appropriate gauge and regulated by an in-line valve. The laminate sample was at an angle for easier observation, and the water was recirculated to assure water contact and not air against the sample's inner bonding layer. The outer layer of the sample was visually observed and gently wiped occasionally with absorbent tissue paper during the desired test time period. Liquid water detected visually or on the tissue was interpreted as a leak. If no liquid water was detected on the sample outer layer in this manner within three minutes, the sample was considered to have passed the Suter Waterproofness Test. A laminate sample passing this test is defined as "waterproof" as used herein.

Waterproofness After Cold Flex

Laminate samples were prepared and tested according to ASTM D 2097-69. Cut samples were wrapped onto the flexer tool in the shape of a cylinder. The flexer was brought to −25° F. within a temperature regulated chamber. Some samples were flexed for 20,000 cycles in the warp direction; other samples were flexed for 20,000 cycles in the fill direction according to ASTM D2097. The flexed samples were tested for waterproofness according the Suter Waterproofness Test described herein, at 1.1 psig for 3 minutes. A sample was considered to have passed the Waterproofness after Cold Flex if no leakage was detected after 3 minutes. For purposes herein, a laminate sample having passed this test is defined as "waterproof after cold flex".

High Pressure Hydrostatic Resistance

The high pressure hydrostatic resistance was determined in accordance with ASTM D751-06 Hydrostatic Resistance, Section 36, Procedure 1. The laminate to be tested was conditioned at 70±2° F., 65±2% RH for at least four hours prior to testing. Next, a 4"×4" square was cut out of the laminate. The sample was placed on the Mullen's test apparatus with the inner bonding layer oriented towards the water. The pressure was generated by a piston that forced water into the pressure chamber of the apparatus at a rate between 5.0 and 6.0 $in^3$/min. The pressure at which the sample burst was recorded as the high pressure hydrostatic resistance.

Waterproofness after Contamination

The waterproofness of a laminate was determined after contamination with synthetic perspiration, Hoppe's® solvent, and DEET.

Synthetic Perspiration

Laminate samples were contaminated on the outer layer by a synthetic perspiration prepared as follows. The following ingredients were added and stirred into 500 ml of distilled water: 3 grams sodium chloride (VWR, Item# JT3624-07), 1 gram predigested protein (Discount Blvd., Item #019016), 1 gram n-propyl propionate (Sigma Aldrich, Item #112267), and 0.5 gram liquid lecithin (phosphatidyl choline; Vitacost.com, Item#380303).

The solution was covered and stirred continuously while heated to 50±1° C., until all ingredients were dissolved, and then cooled to approximately 35° C. The solution was stirred such that any solid particles were suspended in solution prior to contaminating the laminate sample.

Contamination Procedure for Synthetic Perspiration

After the synthetic perspiration is in solution, a 6 inch diameter open surface test cup was provided having a removable stopper in the bottom. A specimen of the laminate to be tested was cut to a size sufficiently large that it extended at least an inch on all sides when laid across the open surface of the test cup with the outer layer side oriented towards the inside of the test cup. An elastic band was used to secure the specimen around the circumference of the test cup so that there would be no leaks when the test cup was subsequently filled with synthetic perspiration. The empty test cup was then inverted and placed on an open grid support. Next the stopper was removed and approximately 180 ml of synthetic perspiration solution was poured into the test cup. The stopper was placed back into the bottom of the now inverted test cup. A standard residential-type fan was position so that it blew air beneath the grid and parallel to the specimen surface. The synthetic perspiration was allowed to evaporate through the specimen for 72 hours. The specimen was then removed from the cup, rinsed in warm water, and allowed to dry and condition at 70±2° F., 65±2% RH. The specimen was then tested for waterproofness as described in "Waterproofness Test Procedure for Contaminated Samples" below.

Contamination Procedure for Hoppe's® Solvent and DEET

Hoppe's® No. 9 solvent, typically used for cleaning guns, was obtained from Bass Pro Shops (www.basspro.com; item number 38-663-886-00.) Laminate samples were contaminated on the outer layer side of the laminate in accordance with the contamination method below, and tested for waterproofness as described in "Waterproofness Test Procedure for Contaminated Samples" below.

DEET (N,N-Diethyl-meta-toluamide) liquid, typically used as insect repellent, was obtained from Coleman's Military Surplus (www.colemans.com; item number 103701.) Laminate samples were contaminated on the outer layer side of the laminate in accordance with the contamination method below, and tested for waterproofness as described in "Waterproofness Test Procedure for Contaminated Samples".

A 10"×10" piece of AATCC white textile blotting paper was placed on a horizontal surface and covered with a 10"×10" laminate sample, pre-conditioned at 70±2° F. and 65±2% RH for at least four hours, with the outer layer side up. About 2.0 ml of liquid contaminant was pipetted and placed on the center of the laminate sample and covered with a 6"×6" piece of AATCC Rhinelander "blue-white" window envelope glassine paper. A 4 pound weight was placed on the glassine paper directly over the contaminated area. The weight was allowed to remain on the laminate sample for 30±1 minutes. The weight and glassine paper were removed, and the laminate sample was allowed to sit undisturbed for an additional 30±1 minutes. Any excess contaminant was wiped off using a fresh piece of blotting paper.

Waterproofness Test Procedure for Contaminated Samples

The waterproofness was tested and determined in accordance with the Method for Determination of Resistance to Water Penetration (BS 3424: Part 26: 1990 Method 29A).

Laminate samples contaminated with synthetic perspiration were subjected to a hydrostatic pressure of 25 psig for 3 minutes on the outer layer side and observed for leakage on the inner layer side.

Laminate samples contaminated with Hoppe's® solvent were subjected to a hydrostatic pressure of 15 psig for 3 minutes on the outer layer side and observed for leakage on the inner layer side.

Laminate samples contaminated with DEET were subjected to a hydrostatic pressure of 10 psig for 3 minutes on the outer layer side and observed for leakage on the inner layer side.

A laminate sample is considered to have passed the Water Penetration test (BS 3424: Part 26: 1990 Method 29A) after contamination if no leakage is observed after 3 minutes at its corresponding hydrostatic pressure. For purposes herein, a laminate sample that passes these tests are considered to be "waterproof after contamination by synthetic perspiration", "waterproof after contamination by Hoppe's® solvent", and "waterproof after contamination by DEET", respectively.

Chemical Penetration Resistance

Chemical penetration resistance of a laminate sample was determined using the standard test method described in ASTM F903C (Procedure C from Table 2 in the Standard). The samples were exposed to the challenge liquid for 5 minutes at ambient pressure on the outer layer; after which, the pressure was increased to 2 psig for one minute; after which the pressure was reduced to ambient for the balance of 60 minutes. The laminate samples were observed on the inner layer side for discoloration or leakage. Testing was discontinued if a droplet of liquid or discoloration appeared, indicating the presence of the liquid. The laminate sample passed if no liquid or discoloration appeared for the duration of the test.

The laminate samples were tested in accordance with this standard procedure utilizing 37 weight percent sulfuric acid or hydraulic fluid as the chemical challenge. The sulfuric acid was purchased from Lab Chem, Inc. (item no. 62739-8.) The hydraulic fluid was purchased from Specialty Chemicals, Inc. (item number 1808751.)

A laminate sample is considered to have passed the chemical penetration test by showing no leakage through the laminate sample as specified in the test method. Laminate samples that passed the chemical penetration tests were considered to be "chemical penetration resistant to sulfuric acid" and "chemical penetration resistant to hydraulic fluid"; and referred to as such herein.

Ballistic Testing

Ballistic panel(s) to be tested were placed inside and secured within the original panel carrier to form the "test panels". The exterior was labeled for identification.

Some test panels were conditioned in accordance with the procedure set forth in the NIJ 0101.06 Standard (Section 5: Flexible Armor Conditioning Protocol), by subjecting the test panels to 10 days of tumbling at 5 RPM, at temperature of 149° F. (65° C.) and 80% relative humidity. The test panels that were conditioned in accordance with this method are referred to as "conditioned". Test panels that were not conditioned are referred to as "new".

The new and conditioned test panels were acclimated for no less than 24 hours to 70±5° F. and 50±20% relative humidity prior to ballistic testing. Test panels were subjected to ballistic performance testing for Perforation Backface Signature (P-BFS) and Ballistic Limit (V50), as described in NIJ Ballistic Resistance of Body Armor Standard 0101.06, at HP White Laboratory, Inc. (Street, Md.). The ammunition caliber used was 9 mm Luger, 124 grain, full metal jacket (FMJ), round nose (RN).

The test panels were mounted on armor backing material, prepared in accordance with Section 4.2.5 of NIJ 0101.06, in an indoor range 17.3 feet from the muzzle of a test barrel to produce zero degree oblique impacts. Velocity screens were positioned at 6.5 and 11.5 feet which, in conjunction with elapsed time counters (chronographs), were used to determine projectile velocities 9.0 feet from the muzzle.

Ballistic Testing: Perforation and Backface Signature ("P-BFS") Measurement

Figure 8:
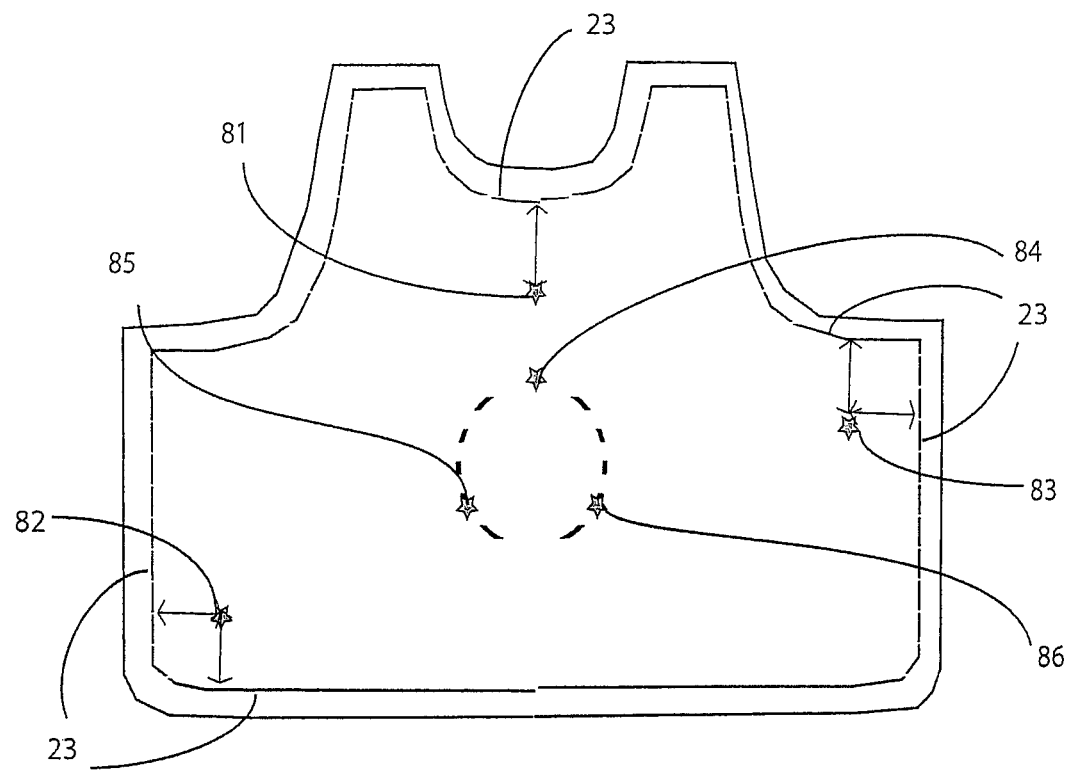
FIG. 8 is an elevational view of an outer surface of a ballistic panel showing a shot pattern used for testing perforation and backface signature according to the method described herein.

The procedure of NIJ 0101.06 Standard was used to determine the "perforation and backface signature" (Section 7.8: P-BFS) of test panels with the following deviations. All six shots were perpendicular to the test panel unless otherwise noted. Each test panel was shot six times in a pattern as described in the NIJ 0101.06 standard, where the pattern was selected as shown in FIG. 8, and as described below. Shots 1, 2, and 3 represent edge shots that were within 65 to 75 mm from the edge (23) of the ballistic resistant component. Shots 4, 5, and 6 represent center shots in the pattern according the procedure in NIJ 0101.06, evenly spaced around a circumference of a 100 mm diameter. A 9 mm FMJ RN bullet was used for all P-BFS tests. A reference velocity (Vref) of 1,245 fps (feet per second) was used for all shots for conditioned and new test panels, so that they may be compared as desired. This Vref is specified in the NIJ 0101.06 Standard for 9 mm ammunition, threat level II conditioned test panels.

The data were reported as the depth (in mm) of deformation in the armor backing material measured on the back-side (human body side) of the shot test panel as described in Section 3.8 of the NIJ 0101.06 Standard.

For new test panels, a minimum of four perpendicular shots were averaged in each P-BFS calculation; any oblique angle shots were not included. For conditioned test panels, data for shots that hit on a crease that formed as a result of the conditioning procedure were not included in the P-BFS calculation. In each conditioned sample, a minimum of five shots were used in the PBFS calculation.

With regard to FIG. 8, the order of the shot ($1^{st}$ to $6^{th}$) to corresponding reference number (FIG. 8, 81-86), is as follows:

| | |
|---|---|
| $1^{st}$ | (81) |
| $2^{nd}$ | (82) |
| $3^{rd}$ | (83) |

-continued

| | |
|---|---|
| 4$^{th}$ | (84) |
| 5$^{th}$ | (85) |
| 6$^{th}$ | (86) |

Ballistic Testing: Ballistic Limit (BL) Determination Test ("V50")

Figure 9:
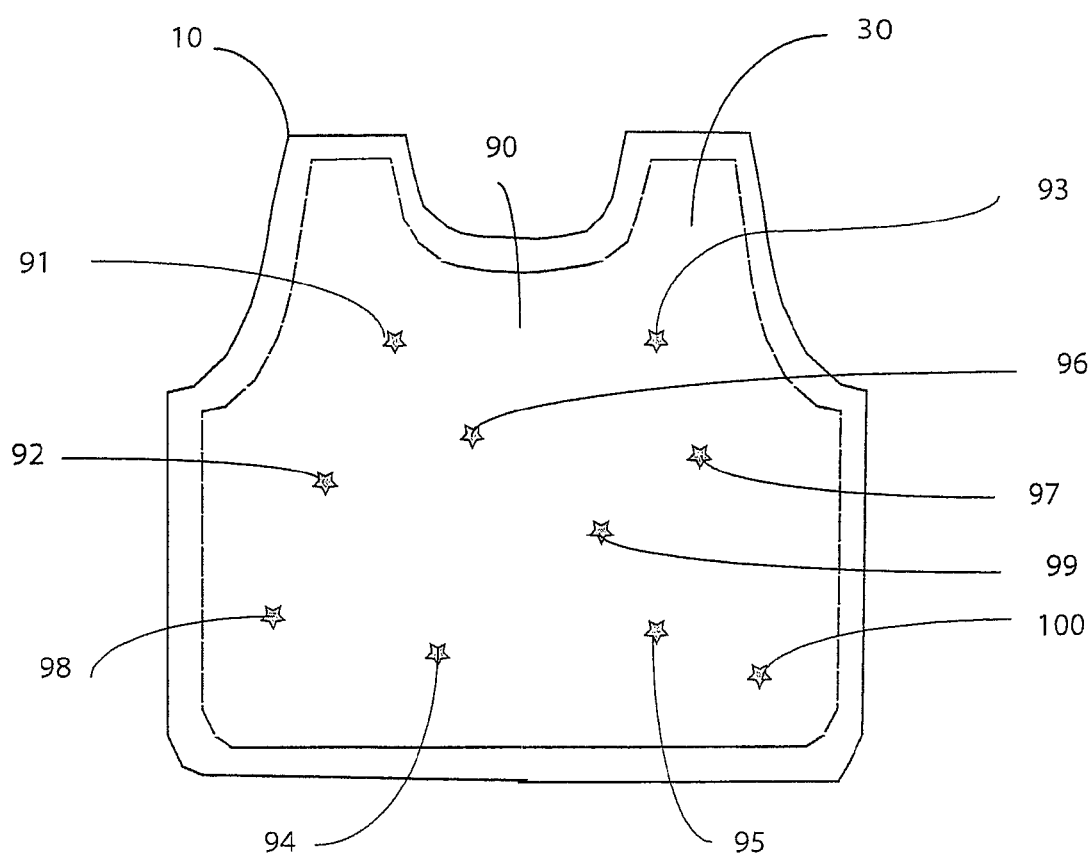
FIG. 9 is an elevational view of an outer surface of a ballistic panel showing a shot pattern used for testing V-50 according to the method described herein.

The procedure described in the NIJ 0101.06 Standard was used to determine the ballistic limit (V50) (Section 7.9) with the following deviation. The actual shot pattern was varied as shown in FIG. 9 and described below to be consistent with all test panels. A 9 mm FMJ RN bullet was used for all V50 tests. The minimum shot-to-edge and minimum shot-to-shot distances were followed according to NIJ 0101.06 Standard recommendation. Shot velocity was varied in accordance with the Standard in order to determine the V50 reported. The data reported were the velocities at which the bullet is expected to perforate the test panel 50% of the time. The results are reported in feet per second (fps). V50 was calculated by averaging the number of velocities, within a 125 fps range, where a stop or perforation was recorded (minimum of three or maximum of five each).

With reference to FIG. 9, the shot pattern (1$^{st}$ to 10$^{th}$) for each test panel (90) was conducted in the following order of shot to corresponding reference number (FIG. 9, 91-100):

| | |
|---|---|
| 1$^{st}$ | (91) |
| 2$^{nd}$ | (92) |
| 3$^{rd}$ | (93) |
| 4$^{th}$ | (94) |
| 5$^{th}$ | (95) |
| 6$^{th}$ | (96) |
| 7$^{th}$ | (97) |
| 8$^{th}$ | (98) |
| 9$^{th}$ | (99) |
| 10$^{th}$ | (100) |

Water-Pick Up

Water weight gain of the test panels was measured after the test panels were conditioned in accordance with the procedure set forth in the NIJ 0101.06 Standard (Section 5: Flexible Armor Conditioning Protocol). After 10 days of tumbling at 5 RPM, 149° F. (65° C.) and 80% relative humidity, the test panels were acclimated for no less than 24 hours to 70±5° F. and 50±20%, and weighed on a calibrated electronic balance. After acclimating, the test panel without carrier, was submersed in water in accordance to the Armor Submersion procedure described in Section 7.8.2 of the NIJ 0101.06 Standard. After submersion, the test panel was dried of excess external water by blotting the outer layer side with a dry towel. The wet test panel was weighed within 10 minutes after submersion using the same balance. The percent water weight gain was calculated as:

$$\% \text{ water weight gain} = \frac{(\text{wet weight} - \text{dry weight}) \times 100}{(\text{dry weight})}$$

EXAMPLES

Laminate 1

Laminate 1 (L1) is comprised of a woven outer fabric layer, a liquid water impermeable middle thermally stable polymer layer comprising a polytetrafluoroethylene (PTFE) membrane, and an inner thermoplastic polyether polyurethane (TPU) bonding layer. L1 has a weight per area of about 5.5 oz/yd$^2$ and thickness of about 11 mils.

The woven outer fabric layer is comprised of nylon 66, 70 denier 34 filament flat warp yarn and nylon 66, 70 denier 66 filament air textured fill yarn with a weight per area of about 2.7 oz/yd$^2$. The thermally stable polymer layer is a PTFE composite (manufactured by WL Gore & Assoc in Elkton Md.), comprising a microporous expanded PTFE (ePTFE) membrane having a weight per area of about 0.50 oz/yd$^2$ (17 g/m$^2$) with a pore volume of about 80% and a Bubble Point of about 20 psi. A continuous non-porous polymer coating of polyurethane is applied to the microporous ePTFE membrane in accordance with U.S. Pat. No. 4,194,041 with weight per area of about 0.35 oz/yd$^2$ (12 g/m$^2$). The weight per area of the PTFE layer was about 0.85 oz/yd$^2$ (29 g/m$^2$).

The woven outer fabric layer is joined to thermally stable polymer layer with a polyether polyurethane adhesive by contacting the side of the ePTFE having the polyurethane coating with the woven outer textile layer, using a discontinuous layer gravure printing process as described in U.S. Pat. No. 4,532,316. A two layer composite is formed that is then cured. A durable water repellent fluoropolymer is applied to the woven outer fabric layer of the two layer composite and cured.

The water repellent-treated two layer composite is joined to a TPU inner bonding layer as follows. A continuous layer of breathable moisture-cured polyether polyurethane adhesive was coated onto the ePTFE membrane side of the two layer composite with, as described in U.S. Pat. No. 4,532,316, at a weight per area of about 0.30 oz/yd$^2$. An inner bonding layer comprising a TPU film having a thickness of about 56 μm and a weight per area of about 1.7 oz/yd$^2$ (Bayer Material Science Company, Inc. of Whately Mass., part number PT1710S) was bonded to the two layer composite by the continuous layer of breathable polyether polyurethane adhesive to form the laminate.

The three ply composite, L1, is then cured. The laminate was tested according to the methods described herein for MVTR, weight, waterproofness (initial and after cold flex), high pressure hydrostatic resistance, waterproofness after contamination, and chemical penetration resistance. The properties of L1 are provided in Table 1.

TABLE 1

Test Results of Laminate 1

| TEST | RESULT (average) |
|---|---|
| MVTR (g/m$^2$/24 hr) | 4180 |
| Weight (oz/yd$^2$) | 5.5 |
| Waterproofness (Suter) | No leaks |
| Waterproofness (Suter) after Cold Flex, warp and fill | No leaks |
| High Pressure Hydrostatic Resistance (psig) | 190 |
| Waterproofness after Synthetic Perspiration | No leaks |
| Waterproofness after Hoppe's Solvent | No leaks |
| Waterproofness after DEET | No leaks |
| Chemical Penetration Resistance with Sulfuric Acid | No leaks |
| Chemical Penetration Resistance with Hydraulic Fluid | No leaks |

Laminate 2

Laminate 2 (L2) was comprised of a ripstop nylon woven outer fabric layer, and a polytetrafluoroethylene (PTFE) layer (WL Gore & Assoc., Inc. Elkton, Md., part number WMUX335000E.) L2 had a weight per area of about 2.5 oz/yd$^2$ and thickness of about 4.8 mils.

The woven outer layer was comprised of nylon 66, 40 denier 34 filament flat yarn for both warp and fill with a weight per area of about 1.6 oz/yd$^2$.

The PTFE inner layer in L2 was the same ePTFE membrane as used in inner layer in L1 also comprising a continuous non-porous polymer coating of polyurethane applied to the microporous ePTFE membrane.

The woven outer layer was joined to the ePTFE layer on the side in which the continuous non-porous polymer coating was applied using the gravure process as described with respect to L1. The durable water repellent treatment was also applied to the woven outer layer as described in L1.

Ballistic-Resistant Component 1 (BRC1)

Woven ballistic-resistant components (BRC1) were obtained that formed parts of a vest (Galls, 1340 Russell Cave Road in Lexington Ky., Galls® Lite Extended, Level II size large, part number BP382.) The vest comprised front and back vest panels, each contained within a carrier. The weight of the front panel weighed within the carrier was about 2.5 lbs; the weight of the back panel weighed within the carrier was about 2.6 lbs.

The vest panels were removed from the carrier, and the vest panels comprised woven ballistic-resistant components within ripstop nylon covers. The nylon cover comprised an outer woven layer of gray ripstop nylon and an inner layer of clear monolithic polyurethane coating. The weight per area of the cover was about 3.7 oz/yd$^2$ and thickness of about 6.7 mils. The ballistic resistant components were removed from the nylon covers and examined. The ballistic-resistant component (BRC1) comprised 22 separate layers of woven p-aramid fibers. The overall dimensions of the woven ballistic-resistant component were about 20 inches wide measured across the bottom edge of a vest, and about 15 inches in height measured from the bottom edge to the highest part of the shoulder area.

Prior to testing or conditioning, the vest panels had average thickness of 7.4 mm.

Ballistic-Resistant Component 2 (BRC2)

Ballistic-resistant components were obtained that formed parts of a vest (Galls, 1340 Russell Cave Road, Lexington, Ky.; Galls® Gold Micro-Fiber with Dyneema® laminate and GoldFlex® laminate, Level II, size large, part number BP388.) The vest comprised front and back vest panels each contained within a carrier. The weight of the front panel weighed within the carrier was about 1.6 lbs; the weight of the back panel weighed within the carrier was about 1.65 lbs.

The vest panels were removed from the carrier, and comprised the ballistic-resistant components within ripstop nylon covers. The nylon cover comprised an outer woven layer of gray ripstop nylon and an inner layer of clear monolithic polyurethane coating. The weight per area of the cover was about 3.7 oz/yd$^2$ and thickness of about 6.7 mils.

The ballistic-resistant components were removed from the nylon covers and examined. The ballistic-resistant component (BCR2) comprised of four layers of woven Gold Micro-Fiber p-aramid placed at the strike face, 16 layers of Honeywell GoldFlex® unidirectional laminate in the center, and eight layers of DSM Dyneema® unidirectional laminate on the side facing the body when worn. The overall dimensions of the ballistic-resistant component were about 20 inches wide measure across the bottom edge of the vest and about 15 inches in height measured from the bottom edge to the highest part of the shoulder area. The ballistic-resistant component had an average weight of about 1.6 lbs and an average thickness of about 4.5 mm.

Example 1

A ballistic panel was formed comprising Ballistic-resistant Component 1 (BRC1) and Laminate 1 (L1) in the following manner.

Two pieces of L1 were cut to dimensions of about 24" long by 20" wide and placed on a flat surface. The woven outer fabric layer of a first piece of laminate was facing down and the TPU inner layer was facing up. BRC1 was removed from its original nylon cover (which was discarded) and placed strike face side up in the center of L1 on the TPU inner layer. The strike face side was labeled by the ballistic-resistant component manufacturer. All loose edge fibers of BRC1 were trimmed and removed or tucked within BRC1 with a brush or fingertips. A second piece of L1 was placed over the BRC1 on a side opposite the strike face with the TPU inner layer facing towards BRC1, and the edges and corners of both L1 pieces extending beyond the perimeter of BRC1 were aligned, forming a BCR1/L1 lay-up.

The BRC1/L1 lay-up was placed on a silicone rubber pad having dimensions of about 48"×30". The silicone rubber pad was of type HT800 (Greene Rubber Co. of Woburn Mass.) The pad thickness was about 0.5 inches, density of about 0.32 g/cm$^3$, and had a compression force of about 10 psi at 25% deflection.

The silicone pad on which the BRC1/L1 lay-up had been placed was located on the lower metal platen of an air actuated heat press (Geo Knight, Brockton Mass.) The heat press was a 13.5 kW Maxi Press model, S/N 461 with approximate dimensions of 48" by 30". The upper platen of the press had heating capability and was stationary, while the lower platen was not heated and slid horizontally in and out for loading.

Prior to loading, the heat press temperature was set to 320° F., the analog pneumatic gauge was set to about 40 psig (pounds per square inch gauge), and the cycle time was set to 60 seconds. The BRC1/L1 lay-up and the silicone pad were centered on the lower platen with the silicone pad positioned on the lower platen and the BRC1/L1 facing upwardly in the direction of the upper platen. A piece of 6 mil Brown Teflon® Cloth purchased from Apparel Machinery & Supply Co. of Philadelphia Pa. approximately 48" by 30" was placed on top of the BRC1/L1 lay-up to prevent excess adhesive from sticking to the platens. The lower platen was then horizontally loaded beneath the upper platen and the start buttons depressed to begin the cycle. The lower platen rose to meet the upper platen and the gauges remained at the set temperature and set pressure for the cycle time. The lower platen then released from the upper platen, was horizontally unloaded and the Teflon® Cloth removed.

The outer cover was labeled "strike face" and the lay-up was flipped 180 degrees to its reverse side and centered on the silicone pad. The Teflon® Cloth was placed over the lay-up as before, and the lower platen was loaded beneath the upper platen and the cycle was repeated at the same set points. After the second cycle, the heat pressed lay-up was unloaded and allowed to cool. After cooling, a portion of heat pressed L1 extending beyond the perimeter of BRC1 was trimmed to the shape of BRC1. The ballistic panel comprised a continuous perimeter seal having a width of about one inch, extending beyond the edge of BRC1 for the perimeter. The perimeter seal of L1 extending beyond the edge of the BRC1 comprised the TPU inner layers of the L1 first and second layers that were in direct contact and bonded together A ballistic panel was formed wherein L1 was bonded to the entire surfaces of both the strike face surface (outer surface) of the BRC1 and the side opposite the strike face (inner surface) of the BRC1. The formed ballistic panel comprised the perimeter seal wherein the first and second L1 pieces extending beyond the perimeter BRC1 were bonded directly together. The thickness of the ballistic panel in the area of BRC1 was about 7.4 mm and the weight of the ballistic panel without the carrier was about 2.3 lbs. Prior to conditioning and/or testing, a single stitch of thread was sewn around the perimeter seal as a precaution to contain the ballistic-resistant component in the event of delamination of the perimeter seal during conditioning. The stitch was sewn approximately 2 mm from the outer most perimeter edge of L1 on a portion beyond the perimeter of the BRC, sewing only through the bonded L1 portions. After conditioning, the ballistic panel was visually examined. The perimeter seal was intact with no apparent delamination or separation of the bonded L1 layers.

Nine ballistic panels prepared as described in Example 1 were placed and secured inside a Galls® panel carrier with the exterior labeled for identification. The carrier comprised strapping and adjustments for wearing on the body. The weight of the ballistic panels weighed within the carrier was about 2.6 lbs.

Five of the nine ballistic panels made according to Example 1 were conditioned according to Section 5 of the NIJ 0101.06 Standard. Two of the Conditioned panels and two panels which were not conditioned ("New") were tested for P-BFS at HP White Laboratory according to the test methods described herein (Perforation Backface Signature ("P-BFS") Measurement).

Two of the conditioned panels and two of the New test panels were tested for V50 (Protection Ballistic Limit ("V50") Measurement) at HP White Laboratory according to the test methods described herein. Another conditioned panel was subjected to the Armor Submersion test as described in NIJ 0101.06 Standard, Section 7.8.2 and measured for Percent Water-Pickup and V50. Results of the testing are reported in Tables 2 and 3.

As reported in Table 2, Example 1 exhibited a measured improvement for P-BFS edge shots, compared to Example 5 in which the panels were tested in the cover as received. Example 1 showed an improvement of about 14% for New panels and 15% for Conditioned panels. An improvement was also seen for center shots, specifically 24% for New panels and 10% for Conditioned panels. For V50, Example 1 showed about the same performance as compared to Example 5, for New panels (within 1%); and showed a measured improvement of 6% for Conditioned ballistic panels.

As reported in Table 3, for V50, Example 1 had a measured improvement of 24% compared to Example 4 after conditioning and water submersion. For Percent Water Pickup, Example 1 had about one-tenth of the water weight gain percentage as Example 4.

TABLE 2

Performance Results for Ballistic Panels New and (Conditioned)

| | Ballistic Panel | | Edges new (conditioned) | Centers new (conditioned) |
|---|---|---|---|---|
| P-BFS (mm) | Example 1 | woven | 28 (26) | 21 (20) |
| | Example 5 | woven | 32 (30) | 26 (22) |
| | Example 3 | composite | 33 (34) | 25 (27) |
| | Example 6 | composite | 38 (36) | 29 (30) |

TABLE 2-continued

Performance Results for Ballistic Panels New and (Conditioned)

| | Ballistic Panel | | Ave. V50: new (conditioned) |
|---|---|---|---|
| V50 (fps) | Example 1 | woven | 1693 (1657) |
| | Example 2 | woven | 1681 (1696) |
| | Example 5 | woven | 1705 (1563) |
| | Example 3 | composite | 1671 |
| | Example 6 | composite | 1638 |

TABLE 3

Conditioned Ballistic Panels After Water Submersion

| | Water Pickup (%) | V50 (fps) |
|---|---|---|
| Example 1 | 2.6 | 1669 |
| Example 4 | 28 | 1344 |

Example 2

A ballistic panel was formed comprising Ballistic-resistant Component 1 (BRC1) and Laminate 1 (L1) in the following manner.

A BRC1/L1 lay-up was prepared according to the method of Example 1.

A model type $21^{st}$ Century Sealing Iron (Coverite, made in Taiwan) set to about 380° F. was hand pressed to the top surface of L1 woven outer fabric layer and moved at a rate of about 12"/min so as to melt the TPU inner bonding layer bonding it to the BRC1 first surface producing a bond (24) width of about 3 mm. A bond in the pattern of a perpendicular grid with spacing of about 1.5" was produced across the entire ballistic panel surface as illustrated in FIG. 10. This process was repeated so that the TPU inner bonding layer of the second piece of L1 was adhered to the second surface of BRC1, in this manner. The TPU inner layer of L1 was bonded uniformly over approximately 15% of the surface of BRC1. The panel cover L1 was trimmed to the approximate shape of the BRC1 with about 1" of overlap around the entire perimeter of the BRC1. Along this edge beyond the perimeter of the BRC1, the TPU layers of L1 were in direct contact, and a 1500W Geo Knight Digital Combo hand press S/N 11243 set at 350° F. was used to heat seal the entire perimeter by hand pressing for 10-15 seconds in 4-6 inch increments forming a perimeter seal. The ballistic panel comprised a continuous perimeter seal around the perimeter of the BRC1, having a width of about 1 inch. The thickness of the ballistic panel was about 7.7 mm and its weight was about 2.7 lbs. Prior to conditioning and/or testing, a single stitch of thread was sewn around the perimeter seal as a precaution to contain the ballistic-resistant component in the event of delamination of the perimeter seal during conditioning. The stitch was sewn approximately 2 mm from the outer most perimeter edge of L1 on a portion beyond the perimeter of the BRC, sewing only through the bonded L1 portions. After conditioning, the ballistic panel was visually examined. The perimeter seal was intact with no apparent delamination or separation of the bonded L1 layers.

Four ballistic panels prepared as described in Example 2 were placed and secured inside a Galls® panel carrier with the exterior labeled for identification. The carrier comprised strapping and adjustments for wearing on the body. The panels were tested at HP White Laboratory in accordance to the conditioning protocol and test methods described herein. Two of the panels were conditioned according to Section 5 of the NIJ 0101.06 Standard. One of the Conditioned test panels and one test panel which was not conditioned ("New") were tested for P-BFS. One other Conditioned test panel and one other New test panel were tested for V50 according to the methods described herein. The results of the testing are reported in Table 2.

As reported in Table 2, for V50, Example 2 as compared to Example 5, had about the same performance for New test panels (within 1%); and had a measured improvement of about 9% for Conditioned test panels.

Example 3

A ballistic panel was formed comprising ballistic-resistant component 2 (BRC2) and Laminate 1 (L1) in the following manner.

A BRC2/L1 lay-up was prepared according to the method of Example 1, except that the BRC1 of Example 1 was substituted with BRC2.

The BRC2/L1 lay-up was placed on a silicone rubber pad as described in Example 1 and loaded onto the heat press as described in Example 1, so that the surface of the BRC2 labeled 'strike face' was facing up. The lay-up was covered with a piece of 6 mil Brown Teflon® Cloth (Apparel Machinery & Supply Co., Philadelphia, Pa.) approximately 48" by 30" to prevent adhesive sticking to the platens, and heat pressed using the settings as described in Example 1.

The lower platen then released from the upper platen, was horizontally unloaded and the Teflon® Cloth removed. The outer panel cover of the lay-up was labeled "strike face" and the lay-up was flipped 180 degrees so that the side of the BRC2 containing Dyneema® was facing up and the lay-up was centered on the silicone pad. One layer of insulation (ARALITE® NP fabric, Southern Mills, Inc., Union City, Ga.) having a thickness of about 38 mils and a weight per area of about 7.2 oz/yd$^2$, was trimmed to the about the size and shape of BCR2 and placed over the lay-up. The Teflon® Cloth was placed over the insulation and the lower platen was loaded beneath the upper platen. The heat press cycle was repeated with the settings at 320° F. and 40 psig, and pressed for 60 seconds. After the second cycle, the heat pressed lay-up was unloaded and allowed to cool for a few minutes. After cooling, the perimeter was trimmed of excess L1 to the shape of BRC2 forming a perimeter seal of about one inch extending beyond the perimeter of BRC2. Along this edge outside of the BRC2, the TPU inner layers of L1 are in direct contact and bonded together. The thickness of the formed ballistic panel in the area of BRC2 was about 4.4 mm with a total ballistic panel weight of about 1.7 lbs. Prior to conditioning and/or testing, a single stitch of thread was sewn around the perimeter seal as a precaution to contain the ballistic-resistant component in the event of delamination of the perimeter seal during conditioning. The stitch was sewn approximately 2 mm from the outer most perimeter edge of L1 on a portion beyond the perimeter of the BRC, sewing only through the bonded L1 portions. After conditioning, the ballistic panel was visually examined. The perimeter seal was intact with no apparent delamination or separation of the bonded L1 layers.

Eight ballistic panels prepared as described in Example 3 were placed and secured inside a Galls® panel carrier with the exterior labeled for identification. The carrier comprised strapping and adjustments for wearing on the body. The panels were tested at HP White Laboratory in accordance to the conditioning protocol and test methods described herein. Four of the panels were conditioned according to Section 5 of the NIJ 0101.06 Standard. Two of the Conditioned panels and two panels which were not conditioned ("New") were tested for P-BFS. Two other Conditioned panels and two other New panels were tested for V50 according to the methods described herein. Results of the testing are reported in Table 2.

As reported in Table 2, Example 3 exhibited a measured improvement, for P-BFS edge shots compared to Example 6, which was tested in the ballistic cover in which it was received. An improvement of about 15% for New panels and 6% for Conditioned panels was reported. An improvement was also seen for center shots, specifically 16% for New panels and 11% for Conditioned panels. For V50, Example 3 had a measured improvement, compared to Example 6, of 2% for New panels.

Example 4

A ballistic panel was formed comprising ballistic-resistant component 1 (BRC1) and Laminate 2 (L2) in the following manner.

BRC1 was removed from its original panel nylon ripstop cover and set aside. A ballistic panel cover was made comprising two pieces of L2 that were cut to the approximate size and shape of BRC1 and oversized so that an extra ¾ inch of L2 extended beyond the perimeter of BRC1. A slit was cut into one of the pieces of L2, parallel to and about 4 inches from the bottom edge which corresponded to the bottom edge of the BRC1; the slit was about 16 inches long and centered. The pieces of L2 were laid on top of each other, with the ePTFE inner layer facing outwardly, and the L2 layers were aligned. A simple stitch, about eight stitches per inch, was made around the perimeter of the aligned L2 pieces with a 0.25 inch seam allowance using a 40 denier cotton wrapped polyester core thread and Juki 160 sewing machine. The joined L2 pieces were then sealed at the sewn seam along the entire perimeter using GORE® Seam Tape (WL Gore & Assoc., Inc, Elkton, Md., part number 6GNAL025NAT) and GORE® seam sealing machine (WL Gore & Assoc., Inc, Elkton, Md., model number 6100A at a speed setting of 15 feet/min, a temperature setting of 650° C., and an air flow setting of 150 cfm, forming a ballistic panel cover.

The ballistic panel cover was then pulled "inside out" through the slit that was made in one of the L2 pieces. BRC1 was then folded towards it center along its length and inserted into the ballistic panel cover through the open slit and positioned to lay flat. The open slit was then sealed with two pieces of GORE® Seam Tape (part number 6GTAM044GLDIBA) each about 17 inches long. This was accomplished by placing one piece of seam tape on the inside of the cover, with the adhesive side of the seam tape facing ePTFE inner layer of L2, so that it fully overlapped and covered the slit. The second piece of seam tape was placed in the same manner on the outside of the ballistic panel cover with the adhesive facing the outer layer of L2. A Geo Knight Digital Combo hand heat press set to 350° F. and used to seal the two pieces of seam tape together over the slit. The heated platen of the hand press was applied manually in overlapping increments of about four to six inches for about 15 seconds each until the entire length of the seam tape was sealed. The weight of the resulting ballistic panel was about 2.6 lbs. and the thickness was about 7.7 mm.

One ballistic panel, prepared as described in Example 4, was placed and secured inside a Galls® panel carrier and the exterior labeled for identification, and conditioned and tested according to the NIJ 0101.06 Standard. The panel was tested at HP White Laboratory for Water Pickup according to the test method described herein. The sample was also tested for V50 after testing for Water Pick-Up. Results are reported in Table 3.

Example 5

A ballistic resistant vest was obtained (Galls, 1340 Russell Cave Road, Lexington Ky.; Galls® Lite Extended, Level II size large, part number BP382.) that comprised vest panels comprising Ballistic-resistant Component 1 (BRC1) enclosed within a nylon ripstop cover. The vest panel was received from Galls® having the nylon cover sealed around the perimeter of the ballistic-resistant component with an ultrasonic weld having a width of about 7.5 mm. The vest panel was secured inside the original Galls® panel carrier and the exterior labeled for identification. The vest panels were tested at HP White Laboratory in accordance to the conditioning (Section 5) and ballistic testing (V50, P-BFS) protocol described in the NIJ 0101.06 Standard.

Two Conditioned vest panels and two vest panels which were not conditioned ("New") were tested for P-BFS. Two Conditioned vest panels and two New vest panels were tested for V50. Results are reported in Table 2.

Example 6

A ballistic resistant vest was obtained (Galls, 1340 Russell Cave Road, Lexington, Ky.; Galls® Gold Micro-Fiber with Dyneema® laminate and GoldFlex® laminate, Level II, size large, part number BP388) that comprised vest panels comprising Ballistic-resistant Component 2 (BRC2) enclosed within a nylon ripstop cover. The vest panel was received from Galls® having the nylon cover sealed around the perimeter of the ballistic-resistant component with an ultrasonic weld having a width of about 7.5 mm. The vest panel was secured inside the original Galls® panel carrier and the exterior labeled for identification. The vest panels were tested at HP White Laboratory in accordance to the conditioning (Section 5) and ballistic testing (V50, P-BFS) protocol described in the NIJ 0101.06 Standard.

Two Conditioned vest panels and two vest panels which were not conditioned ("New") were tested for P-BFS. Two Conditioned vest panels and two New vest panels were tested for V50. Results are reported in Table 2.

We claim:
1. A ballistic panel comprising:
   a ballistic-resistant component comprising ballistic material, the ballistic-resistant component having a first surface, a second surface, and an edge extending between the first and second surfaces;
   a cover comprising first and second waterproof laminate portions surrounding the ballistic-resistant component, the laminate portions comprising
   (i) a woven outer fabric layer,
   (ii) an inner bonding layer comprising a layer of thermoplastic polyurethane having a thickness greater than or equal to about 25 µm, and
   (iii) a thermally stable polymer layer comprising porous polytetrafluoroethylene (PTFE) laminated between the woven outer fabric layer and the inner bonding layer;
   wherein the polyurethane of the inner bonding layer is positioned adjacent the first and second surfaces of the ballistic-resistant component;
   wherein said cover is bonded directly to said first and second surfaces and said edge of said ballistic-resistant component via a thermal bond comprising the thermoplastic polyurethane of the inner bonding layer of first and second laminate portions,
   wherein said thermal bond bonds the first and second laminate portions of said cover directly to the first and second surfaces of the ballistic-resistant component and to said edge of said ballistic component, and
   wherein said thermal bond forms a continuous perimeter seal around said ballistic component.

2. The ballistic panel of claim 1 wherein the ballistic panel is durably waterproof having a water pick-up value of less than 10% water by weight based on the weight of the ballistic panel after conditioning.

3. The ballistic panel of claim 1, wherein the perimeter seal has a width of 10 mm or greater.

4. The ballistic panel of claim 1, wherein the thermal bond bonding the waterproof laminate to the ballistic-resistant component by the thermoplastic polyurethane covers at least 15% of the surface area of both the first and second surfaces.

5. The ballistic panel of claim 1 wherein the ballistic-resistant component comprises multiple layers of woven ballistic material.

6. The ballistic panel of claim 1 wherein the ballistic-resistant component comprises multiple layers of non-woven, unidirectional ballistic material.

7. The ballistic panel of claim 1 wherein the ballistic-resistant component comprises multiple layers of woven ballistic resistant material, multiple layers of non-woven, unidirectional ballistic resistant material, and bonds comprising a thermoplastic material bonding together at least some of the multiple layers of the ballistic-resistant component.

8. The ballistic panel of claim 1 wherein the layer of thermoplastic polyurethane of the inner bonding layer has a thickness greater than or equal to 35 µm.

9. The ballistic panel of claim 1 wherein the layer of thermoplastic polyurethane of the inner bonding layer has a thickness greater than or equal to 50 µm.

10. The ballistic panel of claim 1 wherein the thermoplastic polyurethane is a polyether polyurethane.

11. The ballistic panel of claim 1 wherein the porous PTFE of the thermally stable polymer layer is expanded PTFE (ePTFE).

12. The ballistic panel of claim 1 wherein the porous PTFE of the thermally stable polymer layer is ePTFE that further comprises a monolithic polymer coating.

13. The ballistic panel of claim 12 wherein the side of the porous PTFE that further comprises a monolithic polymer coating is laminated to the outer fabric layer.

14. The ballistic panel of claim 1 wherein the porous PTFE is laminated to the outer fabric layer by discontinuous attachments.

15. The ballistic panel of claim 11 wherein the ePTFE is laminated to the inner bonding layer by a continuous layer of adhesive.

16. The ballistic panel of claim 12 wherein the side of the porous PTFE that is opposite the monolithic polymer coating is laminated to the inner bonding layer.

17. The ballistic panel of claim 1 wherein the woven outer fabric layer of the laminate comprises fibers selected from nylon, aramid, cotton, or blends thereof.

18. The ballistic panel of claim 1, wherein the thermal bond bonding the waterproof laminate to the ballistic-resistant component by the thermoplastic polyurethane covers at least 30% of the surface area of both the first and second surfaces.

19. The ballistic panel of claim 1 wherein the ballistic panel is durably waterproof having a water pick-up value of less than 5% water by weight based on the weight of the ballistic panel after conditioning.

20. A ballistic panel comprising:
a ballistic-resistant component having a perimeter, and first and second surfaces, and an edge extending between the first and second surfaces; and
a cover comprising:
  a. a waterproof laminate comprising,
    (i) a substrate layer, and
    (ii) an inner bonding layer laminated to the substrate layer, wherein the cover is bonded to at least one of the first and second surfaces of the ballistic-resistant component and to the edge of the ballistic-resistant component by the inner bonding layer of the waterproof laminate, and
  b. a second waterproof material layer adjacent a surface of the ballistic-resistant component opposite the surface to which the waterproof laminate is bonded; and
  c. a perimeter seal beyond the edge of the ballistic-resistant component that surrounds the perimeter of the ballistic-resistant component comprising the waterproof laminate bonded to the second waterproof material layer by the inner bonding layer.

21. The ballistic panel of claim 20, wherein the waterproof laminate can withstand a hydrostatic pressure 3 psi for two minutes without leaking.

22. The ballistic panel of claim 20, wherein the ballistic panel is waterproof having a water pick-up value of less than 10% by weight based on the weight of the ballistic panel.

23. The ballistic panel of claim 20, wherein the inner bonding layer of the waterproof laminate is bonded to greater than 15% of the surface area of one surface of the ballistic-resistant component.

24. The ballistic panel of claim 20, wherein the inner bonding layer of the waterproof laminate is bonded to greater than 50% of the surface area of one surface of the ballistic-resistant component.

25. The ballistic panel of claim 20, wherein the inner bonding layer of the waterproof laminate is bonded to greater than 90% of the surface area of one of the first and second surfaces of the ballistic-resistant component.

26. The ballistic panel of claim 20, wherein the second waterproof material layer comprises a second adhesive.

27. The ballistic panel of claim 26, wherein the second waterproof material layer is bonded by the second adhesive to the surface of the ballistic-resistant component that is opposite the waterproof laminate.

28. The ballistic panel of claim 27, wherein the second waterproof material layer is bonded to greater than 30% of the surface of the ballistic-resistant component.

29. The ballistic panel of claim 20, wherein the inner bonding layer of the waterproof laminate is a contact adhesive.

30. The ballistic panel of claim 20, wherein the inner bonding layer of the waterproof laminate is a thermoplastic adhesive.

31. The ballistic panel of claim 20, wherein the inner bonding layer of the waterproof laminate is a thermoplastic polyurethane.

32. The ballistic panel of claim 20, wherein the substrate layer of the waterproof laminate is a fabric layer.

33. The ballistic panel of claim 20, wherein the substrate layer of the waterproof laminate is a monolithic polymeric material.

34. The ballistic panel of claim 20, wherein the waterproof laminate further comprises a thermally stable polymer layer between the substrate layer and the inner bonding layer, and the thermally stable polymer layer has a melt temperature higher than the melt temperature of the inner bonding layer.

35. The ballistic panel of claim 34, wherein the thermally stable polymer layer comprises ePTFE, the substrate layer comprises a fabric layer, and the inner bonding layer comprises a thermoplastic polyurethane having a thickness greater than about 25 µm.

36. The ballistic panel of claim 20, wherein the ballistic-resistant component comprises multiple layers of woven ballistic material.

37. The ballistic panel of claim 20, wherein the ballistic-resistant component comprises multiple layers of non-woven, unidirectional ballistic material.

38. The ballistic panel of claim 20, wherein the ballistic-resistant component is comprised of multiple layers of woven ballistic resistant material and non-woven, unidirectional ballistic resistant material, and bonds bonding together at least some of the layers of the multilayer ballistic-resistant component.

39. A method of making a ballistic panel comprising:
  a. providing a ballistic-resistant component having a perimeter, first and second surfaces, and an edge that extends between the first and second surfaces for the perimeter of the ballistic-resistant component,
  b. providing a cover comprising first and second portions of a waterproof laminate having a surface area greater than the first and second surfaces of the ballistic-resistant component, the waterproof laminate comprising:
    (i) a woven fabric layer,
    (ii) an inner bonding layer comprising a layer of thermoplastic polyurethane having a thickness greater than or equal to about 25 µm, and
    (iii) a thermally stable polymer layer comprising porous polytetrafluoroethylene (PTFE) laminated between the woven fabric layer and the inner bonding layer;
  c. forming a stack comprising the first and second waterproof laminate portions and the ballistic-resistant component by placing the ballistic-resistant component there between;
  d. orienting the stack so that the layer of thermoplastic polyurethane of the first laminate portion is adjacent the first surface of the ballistic-resistant component, the layer of thermoplastic polyurethane of the second laminate portion is adjacent the second surface of the ballistic-resistant component, and the first and second laminate portions extend beyond the edge of the ballistic-resistant component for the entire perimeter;
  e. applying heat and pressure to the stack;
  f. melting and adhering the melted thermoplastic polyurethane of the first and second laminate portions to the first and second surfaces of the ballistic resistant component to form a thermal bond between the laminate and the ballistic-resistant component; and
  g. melting and adhering together the thermoplastic polyurethane of the first and second laminate portions that extend beyond the edge of the ballistic-resistant component around the entire perimeter of the ballistic-resistant component to form a seal.

40. The method of claim 39, wherein at least 1 psi pressure is applied to the stack containing the laminate portions and ballistic-resistant component.

41. The method of claim 39, wherein the heat applied to the laminate and ballistic-resistant component is greater than about 150° C.

42. The method of claim 39, wherein the step of applying heat and pressure is applied with a heat press.

43. The method of claim 39, wherein step of applying heat and pressure is applied with a soldering iron.

44. The method of claim 39, wherein the ballistic-resistant component comprises multiple layers and further comprises a thermoplastic resin, and wherein the step of applying heat and pressure further comprises fusing at least a portion of the multiple layers of the ballistic-resistant component together.

45. The method of claim 39, wherein the polyurethane of the first and second laminate portions is adhered to at least 15% of the surface area of the first and second surfaces of the ballistic resistant component.

46. The method of claim 39, wherein the polyurethane of the first and second laminate portions is adhered to at least 50% of the surface area of the first and second surfaces of the ballistic resistant component.

47. A method for making a ballistic panel comprising:
providing a ballistic-resistant component having a perimeter, and first and second surfaces;
providing a waterproof laminate;
bonding the waterproof laminate to one of the first and second surfaces of the ballistic-resistant component, the waterproof laminate comprising
(i) a substrate layer, and
(ii) an inner bonding layer laminated to the substrate layer, and bonded to one of the first and second surfaces of the ballistic-resistant component;
providing a second waterproof material layer and positioning the second waterproof material layer adjacent a surface of the ballistic-resistant component opposite the surface to which the waterproof laminate is bonded; and
bonding the waterproof laminate to the second waterproof material beyond the edge and around the perimeter of the ballistic-resistant component to form a perimeter seal.

48. A method of improving ballistic performance of a ballistic panel comprising:
forming a ballistic panel by providing a ballistic-resistant component comprising a ballistic material, the ballistic-resistant component having a perimeter, and first and second surfaces;
providing a cover comprising first and second waterproof laminate portions, wherein the laminate portions comprise:
(i) an outer fabric layer,
(ii) an inner bonding layer, and
(iii) a thermally stable polymer layer between the outer fabric layer and the inner bonding layer that has a melt temperature above the melt temperature of the inner bonding layer;
surrounding the ballistic-resistant component with the first and second laminate portions by orienting the inner bonding layer to be positioned adjacent the first and second surfaces of the ballistic-resistant component;
forming a thermal bond comprising the inner bonding layer of first and second waterproof laminate portions and the ballistic-resistant component by bonding the laminate portions directly to the upper and lower surfaces of the ballistic-resistant component; and,
forming a perimeter seal by fusing the inner bonding layer of the first laminate portion and the inner bonding layer of the second laminate portion to form a continuous bond around the perimeter of the ballistic-resistant component,
wherein the ballistic panel has improved ballistic performance when tested after conditioning and submersion in water.

49. A method of stabilizing a ballistic-resistant component by integrating the ballistic resistant component and a cover, said method comprising:
providing a ballistic-resistant component comprising a ballistic material, the ballistic-resistant component having a perimeter, and first and second surfaces;
forming a cover for the ballistic resistant component comprising:
a. providing first and second laminate portions, the laminate comprising:
(i) an outer fabric layer, and
(ii) an inner bonding layer,
b. surrounding the ballistic-resistant component with the first and second laminate portions by orienting the inner bonding layer to be adjacent the first and second surfaces of the ballistic-resistant component; and
c. forming a perimeter seal by bonding the inner bonding layer of the first laminate portion and the inner bonding layer of the second laminate portion together to form a continuous bond around the perimeter of the ballistic-resistant component, forming a cover; and
integrating the cover and the ballistic resistant component by bonding the inner bonding layer of the first and second laminate portions to the upper and lower surfaces of the ballistic-resistant component.

50. The method of claim 49, wherein the inner bonding layer of the first and second laminate portions comprises a thermoplastic polymer and the step of bonding the inner bonding layer to the upper and lower surfaces of ballistic resistant component comprises thermal bonding.

51. The method of claim 50, wherein the step of forming a perimeter seal comprises fusing the inner bonding layer of the first laminate portion to the inner bonding layer of the second laminate portion around the perimeter of the ballistic-resistant component.

52. The method of claim 49, wherein the first and second laminate portions further comprises a thermally stable polymer layer between the outer fabric layer and the inner bonding layer and the thermally stable polymer layer having a melt temperature above the melt temperature of the inner bonding layer.

53. The method of claim 52, wherein the method further comprises applying heat and applying pressure to melt the inner bonding layer and to integrate the first and second laminate portions and the ballistic-resistant component.

54. The method of claim 49, wherein the method improves the ballistic performance of the ballistic panel that is subjected to conditioning and water submersion.

* * * * *